United States Patent
Heins et al.

(10) Patent No.: US 12,366,229 B2
(45) Date of Patent: Jul. 22, 2025

(54) TIGHTENING DEVICE

(71) Applicant: Siemens Gamesa Renewable Energy A/S, Brande (DK)

(72) Inventors: Benjamin Heins, Bremerhaven (DE); Boy Dario Kraemer, Cuxhaven (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 350 days.

(21) Appl. No.: 17/695,915

(22) Filed: Mar. 16, 2022

(65) Prior Publication Data

US 2022/0307477 A1 Sep. 29, 2022

(30) Foreign Application Priority Data

Mar. 26, 2021 (EP) .................................... 21165225

(51) Int. Cl.
*F03D 13/10* (2016.01)
*B23P 19/06* (2006.01)

(52) U.S. Cl.
CPC .............. *F03D 13/10* (2016.05); *B23P 19/06* (2013.01); *B23P 19/067* (2013.01); *F05B 2230/60* (2013.01)

(58) Field of Classification Search
CPC ....... B23P 19/06; B23P 19/061; B23P 19/067; F03D 13/10; F03D 13/112; F03D 80/50; F05B 2230/60; F05B 2230/70; B25J 17/0233
See application file for complete search history.

(56) References Cited

U.S. PATENT DOCUMENTS

| | | | |
|---|---|---|---|
| 9,212,651 B2 | 12/2015 | Johst et al. | |
| 2018/0169805 A1* | 6/2018 | Declerck | ................ B25B 29/02 |
| 2019/0299344 A1* | 10/2019 | Hohmann | ........... B25B 23/0085 |

FOREIGN PATENT DOCUMENTS

| | | | | |
|---|---|---|---|---|
| CA | 2857258 A1 | 6/2013 | | |
| CN | 201824125 U | 5/2011 | | |
| CN | 102536635 A | 7/2012 | | |
| CN | 103252641 A | 8/2013 | | |
| CN | 104325283 A | * 2/2015 | ............. B23P 19/06 |
| CN | 107253043 A | 10/2017 | | |
| CN | 108213929 A | 6/2018 | | |
| CN | 108857354 A | 11/2018 | | |
| CN | 109689281 A | 4/2019 | | |
| CN | 109973337 A | 7/2019 | | |
| CN | 111315532 A | 6/2020 | | |

(Continued)

OTHER PUBLICATIONS

Translation of DE102016006214 (Year: 2016).*

(Continued)

*Primary Examiner* — Matthew P Travers
(74) *Attorney, Agent, or Firm* — Enrique J. Mora

(57) ABSTRACT

A tightening device for a wind turbine configured to fasten and/or tighten a plurality of fasteners to a fastening target object, wherein the fasteners are arranged in a circle. The tightening device includes a center bearing unit for allowing the rotation of the tightening device about a center axis, a torque unit for applying torque on the fasteners to fasten and/or tighten the fasteners to the fastening target object, and a first arm extending in a radial direction from the center bearing unit and supporting the torque unit.

18 Claims, 9 Drawing Sheets

(56) References Cited

FOREIGN PATENT DOCUMENTS

| | | | |
|---|---|---|---|
| DE | 102016006214 A1 * | 12/2016 | |
| EP | 3163071 A1 | 5/2017 | |
| EP | 3593939 A1 | 1/2020 | |
| WO | 2016193297 A1 | 12/2016 | |
| WO | 2019110061 A1 | 6/2019 | |

OTHER PUBLICATIONS

Rainer Müller, Matthias Vette, Leenhard Hörauf: "An adaptive and automated bolt tensioning system for the pitch bearing assembly of wind turbines"; Robotics and Computer-Integrated Manufacturing 36 (2015); p. 119-126.

Keizo Kazama, Hisateru Uyeda, Akihiro Iligashide, Susumu Nunomura, Toshiaki Morii, Hirotoshi Shimoda: "Development of Segment Bolt Tightening Robot"; 1993 Elsevier Science Publishers B.V.

* cited by examiner

TIGHTENING DEVICE

CROSS-REFERENCE TO RELATED APPLICATIONS

This application claims priority to EP Application No. 21165225.0, having a filing date of Mar. 26, 2021, the entire contents of which are hereby incorporated by reference.

FIELD OF TECHNOLOGY

The following relates to a tightening device for a wind turbine configured to fasten and/or tighten a plurality of fastening means to a fastening target object.

BACKGROUND

Wind turbines are increasingly used for the generation of electrical energy. A wind turbine typically comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator to generate electricity. Hence, the rotational energy of the blades is transferred to the generator, which then converts the mechanical energy into electricity and transfers the electricity to the electrical grid.

Hence, wind turbines comprise many components which are coupled together, either at the manufacturing site or at the installation site. For example, at the installation site, the hub and the main bearing or the hub and the blade bearings are coupled together by means of bolt connections. Additionally, a tower comprising a plurality of tower parts is assembled by nut-bolt connections on the flanges of neighboring tower parts. In these cases, the bolts or other fastening means are arranged in a fastening means circle or in a bolt circle and, during the assembly of the components, each single bolt must be fastened and tightened to couple the components together. If this process is done manually, the installation time increases and the costs of installation peak. It also results in safety risks if the operators have to manually tighten the bolts, as they have to operate near suspended loads and high torques.

A manual pretensioning and fastening of bolts is an inefficient process due to the large number of bolts used to couple the components together. Additionally, factors such as temperature, humidity or harsh weather conditions influence the fastening and tightening process.

In case of a damage of the wind turbine during operation, it is difficult to analyze the causes of the damage and to document whether the bolts were tensioned according to the specifications during the installation if this process was done manually.

Therefore, an automatized process for pretensioning and fastening of fastening means is an efficient and fast way to couple components together.

Methods for an automatized process for pretensioning and fastening of fastening means are known from the prior art.

Document WO 2019 110 061 A1 shows a method for an automatic tensioning of bolts in a flange joint between a hub and a main shaft. According to this document, the flange joint is rotated around the main shaft axis from the hub or main shaft side by a rotation means controlled by the control unit. The flange joint is rotated such as to bring a first set of bolts within the working area of the bolt tensioning tools. In this way the bolt tensioning tool can be moved in position by the control unit to be ready to engage with and tension any of the bolts of the first set of bolts as desired and in any order as decided by the control unit. Hence, in this method, the fastening target object, i.e. the flange joint, has to be rotating for the method to work and the pretensioning tool is stationary. The method is not suited for stationary fastening target objects.

Document CA 2857258 A1 presents a method suited for stationary fastening target objects with a robot tightening nut bolts in a joint circular flange connection of a wind turbine. However, as the complete tightening device moves following the bolts of the bolt circle and without having any stationary part, it is difficult to determine the actual location of the robot in the bolt circle. Additionally, the stability of such a robot device during the tightening process cannot be guaranteed, as the counterforces resulting from the tightening process are not being supported, which might result in the robot falling down the surface of the bolt circle.

Another method for an automatized process for pretensioning and fastening of fastening means is the use of robotic arms. Such a method is known from the Document CN 109973337 A. However, this method requires a massive robotic arm and free space for the movements of the arm, thereby limiting the applications in cases where the space is limited.

SUMMARY

An aspect relates to provide a solution for a tightening device that overcomes the problems described above.

According to embodiments of the invention, the tightening device for a wind turbine is configured to fasten and/or tighten a plurality of fastening means to a fastening target object, wherein the fastening means are arranged in a fastening means circle.

The fastening means can be semi-permanent joining means such as bolts, screws, pins, rivets, threads, studs or other longitudinal pieces which can be used as fasteners.

The fastening target object can be a bearing flange or a tower flange, i.e. a flange joint, a bearing housing, a reinforcement plate mounted on a bearing or any other object where a plurality of fastening means is arranged in a fastening means circle.

According to embodiments of the invention, the tightening device comprises a center bearing unit for allowing the rotation of the tightening device about a center axis.

The tightening device can be fixed at the center of the fastening means circle and rotate to fasten and/or tighten the plurality of fastening means arranged in the fastening means circle. This is a simple solution compared to the variants for tightening fastening means known from the prior art, as the tightening device moves in a linear rotational movement and does not have to calculate complex trajectories to reach the next fastening means to be fastened, as it is the case with the tightening devices such as robot arms known from the prior art.

The center axis can be an axis concentric or parallel to the axis of the fastening target object, for example to the axis of a reinforcement plate, to the axis of a blade bearing, to the axis of a main bearing, to the axis of a tower flange, etc.

The center axis can also be set at another point on the fastening target object or on other object depending on the devices already mounted on the fastening target object.

According to embodiments of the invention, the tightening device further comprises a torque unit for applying torque on the fastening means to fasten and/or tighten the fastening means to the fastening target object.

The torque unit is the device providing the torque force to turn and fasten and/or tighten the fastening means to the fastening means object. There is a variety of known torque units in the prior art which can accomplish such task, for example wrenches which can be electrically powered and controlled by a controller unit to apply the needed torque to each fastening means.

According to embodiments of the invention, the tightening device further comprises a first arm extending in a radial direction from the center bearing unit and supporting the torque unit.

The fastening means circle is located at a specific radial distance from a center point. Hence, the tightening device can be fixed at this center point and an arm extends from this center point to the radial length of the fastening means circle. By arranging or shifting the torque tool to this radial length, the torque tool is then positioned at the same diameter as the fastening means circle. As the tightening device can rotate about the center axis, which in this example is set at the center of the fastening means circle, all fastening means in the fastening means circles can be reached by rotating the arm, thereby rotating the torque unit, to the specific angular position of each fastening means about the center axis.

The first arm can extend in a radial direction from the center bearing unit to at least the diameter of the fastening means circle and the torque unit can be mounted on the first arm at the diameter of the fastening means circle.

The solution provided here takes less space than other devices for the fastening and tightening of fastener means, as the rotational axis of the tightening device can be mounted concentric to the fastening means circle and/or parallel to the axis of the fastening target object and the tightening device only requires sufficient space to be able to rotate around the center axis.

According to a preferred embodiment of the invention, the tightening device is configured to remove the fastening means from the fastening target object.

Hence, the tightening device can be used as a tightening/fastening tool to tighten and/or fasten the fastening means to the fastening target object, but also as a fastening means removal tool to loosen or detach fastening means from the fastening target object. For example, by turning the torque tool in one rotational direction, the fastening means are tightened and by turning the fastening tool in the reverse rotational direction, the fastening means are loosened.

According to another preferred embodiment of the invention, the center bearing unit comprises an outer bearing ring connected to the first arm of the tightening device, an inner bearing ring connected to the fastening target object or to an object coupled to the fastening target object, for example the bearing flange of the main bearing or of the blade bearing or to a reinforcement plate coupled to the main bearing or to the blade bearing, and a plurality of roller elements arranged between the outer bearing ring and the inner bearing ring for allowing the rotation of the outer bearing ring, and thus the rotation of the tightening device, around the center axis.

The center bearing unit of the tightening device can be arranged and fixed at the reinforcement plate of a bearing or directly at the blade bearing or at the main bearing. If it is used to couple tower flanges, it can be arranged and fixed at the tower flange. Alternatively, it can be fixed to a separate component, which can itself be fixed at the reinforcement plate of a bearing or directly at the blade bearing or at the main bearing or at a tower flange.

According to another preferred embodiment of the invention, the fastening target object is a blade bearing. The blade bearing is attached to the hub with fastening means arranged in a fastening means circle. For example, the outer ring of the blade bearing is mounted on the casted hub and fastened to the hub by means of a bolt circle, arranged at a bearing flange of the outer bearing ring.

According to another preferred embodiment of the invention, the reinforcement plate is mounted to the inner ring of the blade bearing. The attachment of the reinforcement plate to the inner ring of the blade bearing can be done with a bolt circle. This bolt circle can be tightened and/or fastened by the tightening device.

According to another preferred embodiment of the invention, the tightening device is mounted to the reinforcement plate with a clamping mechanism.

According to another preferred embodiment of the invention, the tightening device is mounted to the inner ring of a blade bearing or to an inner ring of the main bearing.

According to another preferred embodiment of the invention, the tightening device can be mounted by means of a bolt circle to the fastening target object.

According to another preferred embodiment of the invention, the center bearing unit comprises an inner bearing ring connected to the first arm of the tightening device, an outer bearing ring connected to the fastening target object or to an object coupled to the fastening target object, for example the bearing flange of the main bearing or of the blade bearing or to a reinforcement plate coupled to the main bearing or to the blade bearing, and a plurality of roller elements arranged between the outer bearing ring and the inner bearing ring for allowing the rotation of the inner bearing ring, and thus the rotation of the tightening device, around the center axis.

According to another preferred embodiment of the invention, the tightening device further comprises a rotational movement unit which generates the rotational movement of the tightening device around the center axis.

The rotational movement unit is a unit of the tightening device powered to generate the rotation of the arm about an axis to be able to reach all fastening means in the fastening means circle.

The rotational movement unit can be a motor powered by electrical energy.

Hence, the use of a rotational movement unit together with a center bearing unit allows to rotate the arm about an axis to reach the fastening means arranged in the fastening means circle.

According to another preferred embodiment of the invention, the rotational movement unit rolls on a bearing flange. For example, the rotational movement unit can roll on a bearing flange of the outer bearing ring of the blade bearing or on a bearing flange of the outer bearing ring of the main bearing. The rolling surface can be for example the outer lateral surface of the bearing.

According to another preferred embodiment of the invention, the rotational movement unit comprises a rotating means arranged at a support.

A motor can power the rotating means to roll on a surface. A support can hold the rotating means at at least two points to have a stable and controlled rotation of the rotating means. The motor used can for example be a servo motor.

According to another preferred embodiment of the invention, the rotating means is a sphere. A sphere is a compact rotating means which can be supported by a shaft passing through the sphere, wherein two rotational movement unit arms hold the shaft from the sides of the sphere. The sphere can be turned by turning the shaft by means of a motor. The sphere can roll on a surface of the fastening target object. The sphere can have a friction surface.

According to another preferred embodiment of the invention, the rotating means is a friction wheel. A friction wheel can have a friction surface which rolls on a surface of the fastening target object. Similar to the embodiment with a sphere, the rotation can be generated by a shaft attached to the wheel powered by a motor. Two rotational movement unit arms can hold the shaft from the sides of the friction wheel.

Alternatively, the friction wheel can have bearings and be directly supported by the rotational movement unit arms.

According to another preferred embodiment of the invention, the rotating means rotates on a rotational movement unit rail to accurately control the rotation and position of the tightening device.

The combination of a friction surface and a rotational movement unit rail prevents slippage of the rotating means in order to accurately rotate and position the tightening device about the center axis. Even if a friction surface is not used, the rotational movement unit rail can be effectively used to prevent the slippage of the rotating means.

According to another preferred embodiment of the invention, the rotational movement unit is attached at the radial outer end of the first arm of the tightening device. If the tightening device comprises a plurality of arms, further rotational movement units can be attached to the radial outer ends of each arm as well.

As the circumference of a circle increases proportionally to the radius of the circle, attaching the rotational movement unit to the radial outer end of the circle results in a longer rotational trajectory of the rotational movement unit and, therefore, in a more precise rotation of the tightening device. By controlling the movement of the rotating means of the rotational movement unit, the rotation of the tightening device can be accurately determined, as well as the actual angular position of the tightening device about the center axis.

According to another preferred embodiment of the invention, the rotational movement unit is attached to the first arm or to any further arm by a rotational movement unit rail extending in a radial direction.

This feature allows to shift the rotational movement unit in radial direction to change the radial location of the rotational movement unit. Hence, the same tightening device comprising a displaceable rotational movement unit can be used for different fastening target objects with different outer diameters, as the rotational movement unit can be adjusted to the diameter of the fastening target object.

According to another preferred embodiment of the invention, the rotational movement unit rolls on the lateral surface of the fastening target object.

If the fastening target object is a flange, the rotational movement unit can roll on the lateral surface of this flange, the lateral surface being parallel to the axis of the flange and/or parallel to the center axis of the tightening device. As the lateral surface of the flange is round, thereby having a constant diameter, it is easy to roll the rolling means of the rotational movement unit on the lateral surface or to roll the rolling means of the rotational movement unit on the rotational movement unit rail set on the lateral surface of the fastening target object.

If the rotational movement unit is attached to the first arm or to any further arm by a rotational movement unit rail extending in a radial direction, then the rotational movement unit's radial location can be easily adjusted so that the rolling means sits on the lateral surface of the fastening target object.

An advantage of having to arms having each a rotational movement unit rolling on the lateral surface of the fastening target object is that the forces of pressing one rotational movement unit against the lateral surface on one side can be compensated by the second rotational movement unit rolling on the lateral surface at the opposite side.

Alternatively, the rotational movement unit can roll on the surface perpendicular to the center axis of the tightening device, i.e. the surface where the fastening means circle is arranged. This allows for a more compact version of the tightening device, as the design of the arms do not have to surpass the outer diameter of the fastening target object. This is a valid option for applications where the spacing is limited.

According to another preferred embodiment of the invention, the rotational movement unit comprises sensors to accurately compute the position of the tightening device.

The sensors can be placed at the rotating means to measure the rotational speed of the rotating means in a similar way as sensors placed at the wheels of cars to measure the mileage of the car. Hence, the rotational sensors can be placed at the rotating means to measure the displacement of the tightening device about the center axis.

The sensors can also be placed at the rotational movement unit rail to accurately calculate the position of the rotating means, and thus, the angular position of the tightening device. This gives feedback on the actual position of the rotational movement unit on the rotational movement unit rail, and therefore, on the actual angular displacement of the tightening device.

The sensors can be sensors measuring the rotation angle, the rotation speed, and/or the tilt angle of the rotational movement unit.

According to another preferred embodiment of the invention, the center bearing unit comprises an angle sensor, which supplies the controller unit with the angular position of the outer bearing ring, and therefore, with the angular position of the tightening device. For example, the angle sensor used for the center bearing unit can be a high accuracy rotary encoder.

The use of an angle sensor at the central bearing unit together with sensors measuring the rotation angle or sensors measuring the rotational speed of the rotational movement unit helps to accurately determine the angular position of the tightening device and to be able to compute the angular position even if the sensors of the center bearing unit or the sensors of the rotational movement unit fail, as the other sensors can still measure the position of the tightening device. Additionally, the use of tilt sensors placed at the center bearing unit and/or at the first and/or second arm and/or at the rotational movement unit is advantageous for detecting misalignments of the complete tightening device by controlling the tilting of the tightening device.

In the case of a tightening device with a shiftable rotational movement unit at the outer radius of the arms pressing against the lateral surface of the fastening target object, misalignments of the complete tightening device can be corrected by radially shifting the arm relatively to the rotational movement unit, thereby correcting the misalignments.

In the case of a two-arm tightening device with shiftable rotational movement units at the outer radius of the arms pressing against the lateral surface of the fastening target object, misalignments of the complete tightening device can be corrected by radially shifting the rotational movement units, thereby resulting in more pretension or less pretension of the tightening device against the fastening target object depending on the shifting direction of the rotational movement unit against the fastening target object.

According to another preferred embodiment of the invention, the torque unit comprises a tightening socket configured to be engaged with the fastening means to tighten and/or fasten the fastening means to the fastening target object.

The tightening socket can have an internal profile matching the external profile of the fastening means. For example, the tightening socket can have an internal hexagonal shaped profile, i.e. a hole with a hexagonal shape on the surface of the tightening socket. This internal hexagonal shaped profile then matches hexagonal shaped fastening means in order to engage the socket with the fastening means.

Alternatively, the tightening socket can have an external profile matching an internal profile of the fastening means. For example, the tightening socket can have a hexagonal shaped body adapted to receive a complimentary shaped hex key or a bit with a hexagonal shape with matches with an internal hexagonal shaped profile of the fastening means.

According to another preferred embodiment of the invention, the tightening socket is releasably connected to the tightening device. Hence, depending on the type of fastening means, a specific tightening socket is used, and the tightening sockets can be interchanged without having to replace the torque unit with a different one.

Hence, the tightening socket can be releasably connected to the torque unit to match the profile of the tightening socket to the profile of the fastening means.

The tightening socket can for example be adapted to receive different types of keys or bits or be completely removable from the torque unit. An advantage is that in case of damage, for example due to deformation, of the tightening socket, the tightening socket can be easily replaced if it is releasably connected to the torque unit.

Different forms of bits attached to the tightening sockets can be used. For example, for fastening means having a single horizontal indentation, i.e. a slot, a slot screwdriver can be attached to the tightening socket. Alternatively, for fastening means having two indentations, which are oriented perpendicular to each other, i.e. a cross or a double-slot, a cross screwdriver can be attached to the tightening socket. Other shapes such as a triangle, square, double-square, triple-square, pentagon, double hex, pentalobe, hexalobular, etc. can be used and a bit designed accordingly with the corresponding shape can be arranged at the tightening socket.

According to another preferred embodiment of the invention, the torque unit comprises a torque unit rail for shifting the torque unit along a radial direction in order to match the radial position of the torque unit with the radial position of the fastening means circle.

According to another preferred embodiment of the invention, the torque unit comprises a torque unit rail for shifting the torque unit along an axial direction in order to engage the torque unit with the fastening means to tighten the fastening means to the fastening target object.

The torque unit rail can extend along a radial direction, which allows for the shifting of the torque unit along the radial direction. Similarly, the torque unit rail can extend along the axial direction, which allows for the shifting of the torque unit along the axial direction.

A combination of torque unit rails extending in the radial direction with torque unit rails extending in the axial direction is advantageous, as the position of the torque unit can be completely adjusted in both directions to match with the position of the fastening means.

The shifting of the torque unit in the radial direction allows the torque unit to match the radial position of the fastening means circle. Therefore, once the radial position of the torque unit matches the radial position of the fastening means circle and if the center axis of the tightening device matches the axis passing through the center of the fastening means circle, then the tightening device only has to be rotated to reach all angular and radial positions of the fastening means in the fastening means circle.

Once the radial and angular position of a fastening means to be fastened and/or tightened is reached by the torque unit, then the torque unit has to reach the axial position in order to engage the torque unit with the fastening means. This can be achieved by using torque unit rails extending in the axial direction, as this allows to move the torque unit axially and, therefore, to approach and engage with the fastening means.

An alternative or an additional measure which can be used for the torque unit to approach and engage with the fastening means is the use of a hydraulic system or a telescopic system which help gain axial length, thereby approaching the fastening means with the torque unit.

The torque unit rails can be mounted on the first arm, on the second arm and/or on any other further arm of the tightening device.

According to another preferred embodiment of the invention, the torque unit comprises a tolerance compensation unit to adjust misalignments between the torque unit and the fastening means.

Misalignments between the torque unit and the fastening means are common due to the torque forces exerted at the torque unit during tightening of fastening means. The tolerance compensation unit brings the torque unit back to its original position. Additionally, the tolerance compensation unit compensates for manufacturing tolerances, which play a key role in wind turbine components as they are higher than in other bearing and flange applications due to the large size of the bearings and flanges.

According to another preferred embodiment of the invention, the tolerance compensation unit comprises a plunger spring unit, wherein the plunger spring unit comprises a plurality of plungers and springs and exerts a radial force on a shaft of the torque unit to adjust misalignments between the torque unit and the fastening means.

The plungers can be pretensioned to maintain the torque unit centered at all angular positions of the tightening device. Hence, a misalignment of the torque unit results in plungers being pushed and their corresponding springs being compressed at one side of the plunger spring unit and in plungers being pulled and their corresponding springs being extended at the opposite side of the plunger spring unit. Hence, the pushed plungers and the pulled plungers will both push and pull the torque unit back to its original position.

According to another preferred embodiment of the invention, the torque unit comprises a torque unit bearing for allowing a rotation of the torque unit around the torque unit axis to fasten and/or tighten the fastening means.

The torque unit axis can be parallel to the center axis.

Additionally, the combination of a torque unit bearing of the type of a plain bearing with the plunger spring unit improves the capability of the a tolerance compensation unit to compensate misalignments, as a misalignment of the shaft results in an overpressure of the fluid of the plain bearing, which together with the pretensioned plungers shift the shaft back to the aligned position.

According to another preferred embodiment of the invention, the torque unit comprises a first baseframe mounted on a torque unit rail extending in the radial direction, which allows the torque unit to shift in the radial direction.

The torque unit rail can be mounted on the first arm, on the second arm or on any further arm of the tightening device.

According to another preferred embodiment of the invention, the torque unit further comprises a second baseframe mounted on a torque unit rail, the torque unit rail being mounted on the first baseframe and extending the axial direction which allows the torque unit to shift in the axial direction.

According to another preferred embodiment of the invention, the torque unit comprises a pneumatic cylinder to drive the torque unit on the torque unit rails.

According to another preferred embodiment of the invention, the rotational movement unit comprises a pneumatic cylinder to drive the rotational movement unit on the rotational movement unit rails.

According to another preferred embodiment of the invention, the torque unit further comprises a counter holder, which is a torque reaction arm which reduces the counterforce at the torque unit during the tightening or fastening operation.

According to another preferred embodiment of the invention, the tightening device comprises an energy chain supported by a guide and connected to an energy supply to provide energy to the tightening device.

The guide can turn if it is mounted on the rotating part of the tightening device, for example, if it is mounted on the outer bearing ring of the center bearing unit. Alternatively, the guide can be a static element if it is mounted on a static part of the tightening device, for example, if it is mounted on the inner bearing ring of the center bearing unit.

By designing the energy connection as an energy chain, the energy chain can move and follow the rotation of the tightening device.

According to another preferred embodiment of the invention, the tightening device comprises a controller unit to control the rotation, angular position and/or tightening progress of the tightening device.

A controller unit collects information of the sensors placed at the tightening device and can efficiently control the tightening device to enhance the tightening process.

The connections between the sensors at the tightening device and the controller unit can be done with cables arranged at the energy chain used for the energy supply.

The controller unit can for example compute the angular offset between the fastening means by computing the number of fastening means in the fastening means circle. The torque used at the torque unit can also be set at the controller unit to a predefined value.

Additionally, the controller unit can save data about the pretensioning of the fastening means and compare the data during maintenance intervals to find weak fastening means and damages due to prematurely loosened fastening means. Each fastening means of the fastening means circle can be individually reviewed at a prognosis of its lifetime can be computed.

According to another preferred embodiment of the invention, the first arm is a detachable arm being attached to the center bearing unit by a removable connection.

According to another preferred embodiment of the invention, the second arm is a detachable arm being attached to the center bearing unit by a removable connection.

According to another preferred embodiment of the invention, all the arms of the tightening device are detachable arms being attached to the center bearing unit by a removable connection.

The detachable arms can be coupled to the center bearing unit by means of a pin-socket connection comprising a lock pin at the center bearing unit and a lock socket at the detachable arms. Alternatively, the lock socket can be placed at the center bearing and the lock pin can be placed at the detachable arm. Other types of releasable connections and semi-permanent joining methods between the detachable arms and the center bearing unit are possible.

Under releasable connection is to be understood a connection between components which can be released without damage of the single components. This connection can be achieved by a semi-permanent joining method. For example, a bolt, screw, pin, rivet, thread, stud or other longitudinal piece can be used as the fastener of the components.

The benefit of using detachable arms which can be detached and released from the tightening device is that they can be more easily replaced in case of damage without having to mount a new center bearing unit, i.e. without having the change the complete setup of the tightening device. Additionally, if one torque unit malfunctions and the tightening device comprises a plurality of torque units, the detachable arm comprising the malfunctioning torque unit can be detached and the rest of the torque units can proceed with the fastening and/or tightening process.

According to another preferred embodiment of the invention, the tightening device comprises a counterweight attached to the tightening device. The counterweight can be attached to the tightening device at the opposite radial direction than the first arm and/or than any other arm of the tightening device.

The counterweight accounts for the weight of detachable arms which might have been removed from the tightening device for example due to malfunctioning. The counterweight brings more stability to the tightening device by shifting the center of gravity to the center axis.

According to another preferred embodiment of the invention, the tightening device comprises a second arm extending at the opposite radial direction of the first arm.

The use of two arms significantly reduces the tightening and/or fastening process time of the tightening device to tighten the fastening means of a fastening means circle, as two fastening means can be simultaneously fastened and/or tightened by each torque unit arranged at each of the two arms.

According to another preferred embodiment of the invention, the tightening device comprises a plurality of arms extending at different radial directions.

The higher the number of arms, the more the tightening and/or fastening process time of the tightening device to tighten the fastening means of a fastening means circle is reduced.

Yet another aspect of embodiments of the invention is a method for fastening and/or tightening a plurality of fastening means arranged in a fastening means circle to a fastening target object by means of a tightening device. The tightening device comprises a center bearing unit, a torque unit, and a first arm extending radially from the center bearing unit. The method comprises the steps of:
adjusting the radial position of the torque unit in order to match with the radial position of the fastening means circle, adjusting the angular position of the torque unit in order to match with the angular position of the first fastening means to be fastened and/or tightened, engaging the torque unit with the first fastening means, and fastening and/or tightening the first fastening means.

The method can be repeated by rotating the tightening device to the next fastening means of the fastening means circle until all the fastening means of the fastening means circle are fastened and/or tightened.

BRIEF DESCRIPTION

Some of the embodiments will be described in detail, with reference to the following figures, wherein like designations denote like members, wherein.

DETAILED DESCRIPTION

Figure 1:
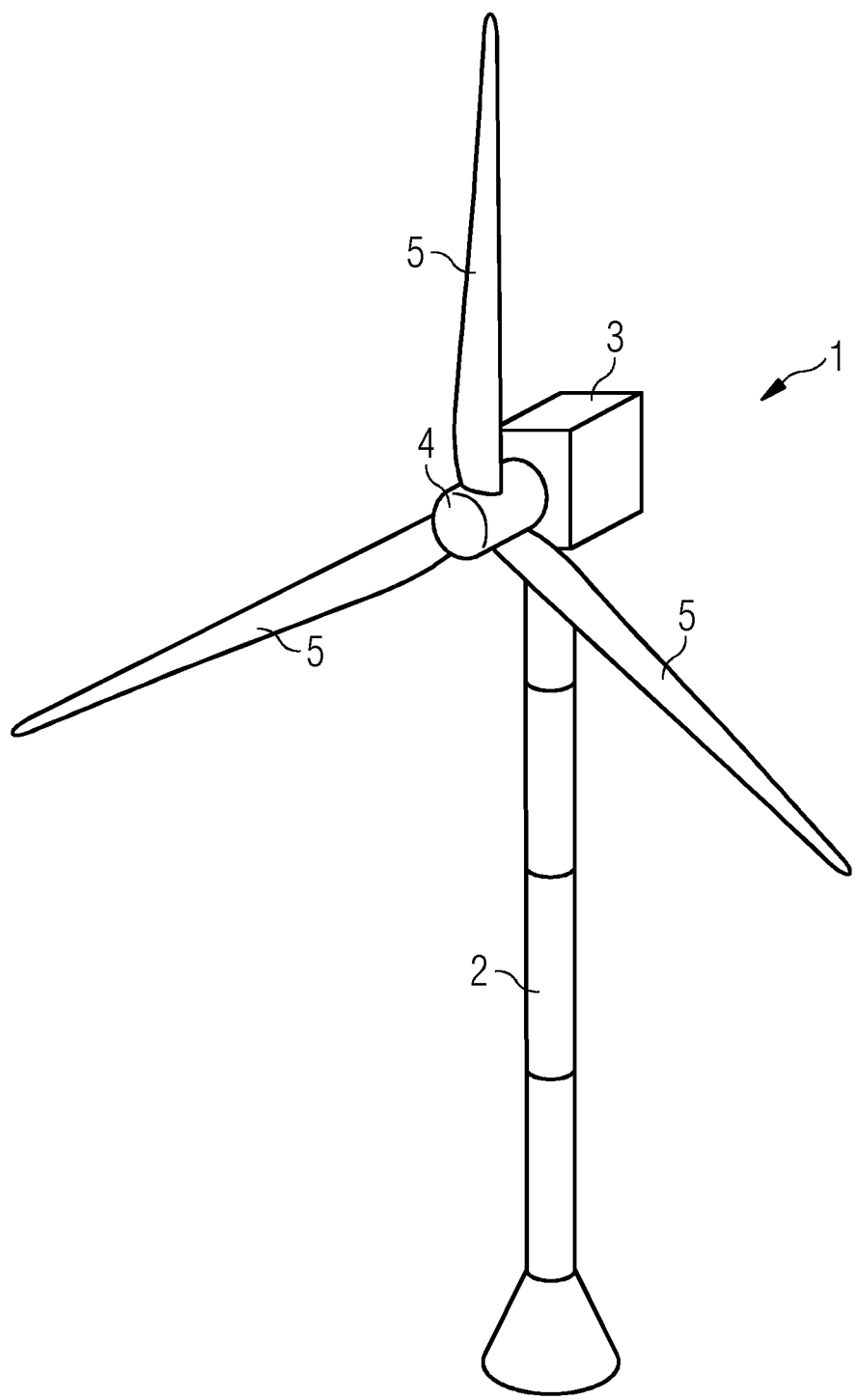
FIG. 1 shows a perspective view of a wind turbine.

FIG. 1 shows a wind turbine 1 comprising a tower 2, a nacelle 3 arranged at an upper end of the tower 2, a hub 4 connected to the nacelle 3 and three blades 5 extending from the hub 4.

Figure 2:
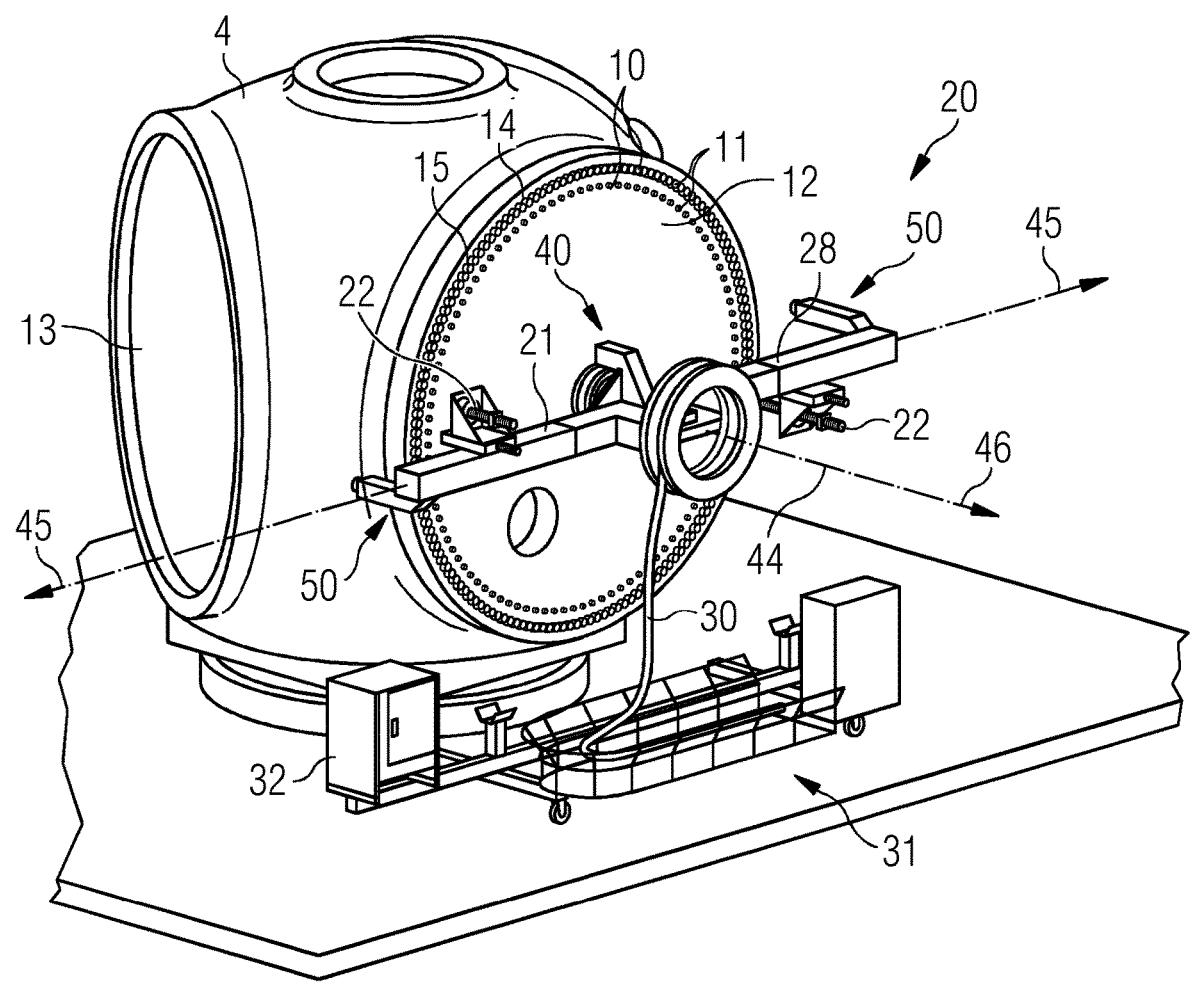
FIG. 2 shows a tightening device according to an embodiment of the invention mounted on a reinforcement plate of a blade bearing and configured to fasten the bolts of the blade bearing flange by means of a torque unit attached at a first arm and a further torque unit attached at a second arm of the tightening device.

FIG. 2 shows a tightening device 20 according to an embodiment of the invention mounted on a reinforcement plate 12 of a blade bearing and configured to fasten the bolts of the bearing flange 15 by means of a torque unit 22 attached at a first arm 21 and a further torque unit 22 attached at a second arm 28 of the tightening device 20.

The fastening means 11 tightened and/or fastened by the tightening device 20 in this example are the fastening means 11 arranged at the fastening means circle 10 of the bearing flange 15.

Additionally, the tightening device 20 can be used to tighten the fastening means 11 of the reinforcement plate 12, which couple the reinforcement plate 2 to the blade bearing, as the fastening means 11 of the reinforcement plate 2 are arranged in a fastening means circle 10. This can be done if the reinforcement plate 12 is already fixed to the blade bearing. For example, during maintenance works, it is possible to check the pretensioning of the bolts coupling the reinforcement plate 12 with the blade bearing and tighten them if needed by means of the tightening device 20.

In this example, the fastening means 11 are bolts and the fastening means circle 10 is a bolt circle. The bearing flange 15 is in this case the fastening target object 14, as the bolts are tightened to the flange of a blade bearing in the hub 4 of the wind turbine 1.

During the fastening and/or tightening process, the reinforcement plate 12 and the bearing flange 15 are stationary and coupled together.

A hub opening 13 for the mounting of a second blade bearing can be seen at the left side of FIG. 2. In this hub opening 13, a blade bearing can be installed. The bearing flange 15 of the second blade bearing can be fastened to the hub 4 by means of bolts, tightened with the tightening device 20. On the blade bearing, a reinforcement plate 12 can be arranged and fastened to the blade bearing by means of bolts, tightened with the tightening device 20.

The tightening device 20 comprises a center bearing unit 40 arranged at the center of the reinforcement plate 12 for allowing the rotation of the tightening device 20 around a center axis 44 concentric to the axis of the blade bearing, of the reinforcement plate 12 and/or of the fastening means circle 10.

The tightening device 20 comprises a guide 33 in an axial direction 46 of the center bearing unit 40 for supporting an energy chain 30. The energy chain 30 allows for an electrical connection of the tightening device 20 with the energy supply 31 to supply the components of the tightening device 20 with power.

Additionally, the controller signals from the controller unit 32 to the tightening device 20 and the signals from the angular, position and torque sensors from the tightening device 20 to the controller unit 32 can be transported by means of the energy chain 30.

The tightening device 20 shown in FIG. 2 has a first arm 21 with a torque unit 22 attached to the center bearing unit 40 and a second arm 28 with a torque unit 22 attached to the center bearing unit 40. Both the first and second arms 21, 28 extend in a radial direction 45 from the center bearing unit 40 to the outer diameter of the bearing flange 15. At the radial outer end of the first and second arms 21, 28, a rotational movement unit 50 is arranged. The rotational movement unit 50 generates the rotational movement of the tightening device 20 around the center axis 44.

Hence, the torque unit 22 is arranged perpendicular to the surface of the reinforcement plate 12 and perpendicular to the front surface of the bearing flange 15 and can be shifted for positioning on the respective bolt.

Figure 3:
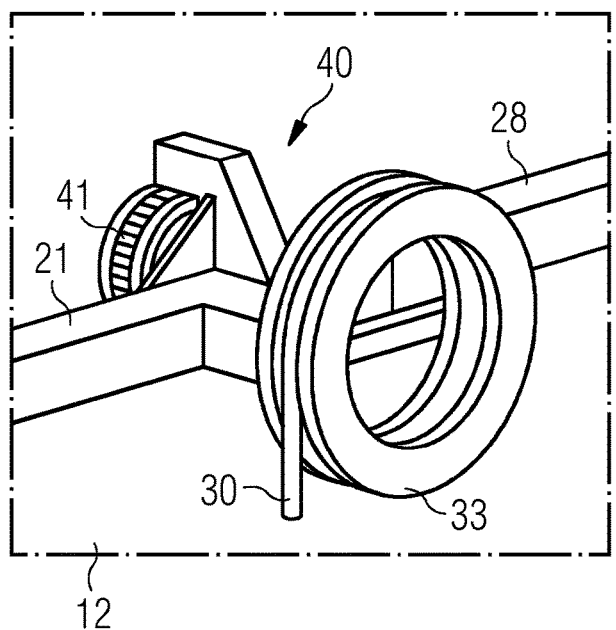
FIG. 3 shows a perspective view of the mounting of the tightening device on the reinforcement plate by means of a center bearing unit.
Figure 4:
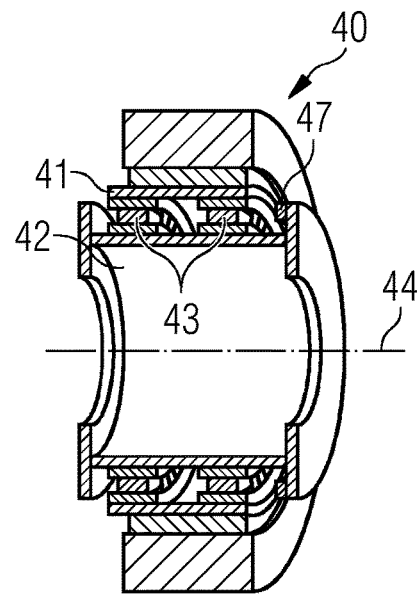
FIG. 4 shows a cross-sectional view of the mounting of the tightening device on the reinforcement plate by means of a center bearing unit.

FIGS. 3 and 4 show the attachment of the tightening device 20 on the reinforcement plate 12 by means of the center bearing unit 40.

The center bearing unit 40 comprises an outer bearing ring 41 connected to the first and second arms 21, 28 of the tightening device 20, an inner bearing ring 42 connected to the reinforcement plate 12, which is itself fixed to the bearing flange 15, and a plurality of roller elements 43 arranged between the outer bearing ring 41 and the inner bearing ring 42 for allowing the rotation of the outer bearing ring 41, and thus the rotation of the tightening device 20, around the center axis 44.

The center bearing unit 40 further comprises an angle sensor 47, which supplies the controller unit 32 with the angular position of the outer bearing ring 41, and therefore, with the angular position of the tightening device 20. In this Figure, the angle sensor 47 is a high accuracy rotary encoder.

The center bearing unit 40 can further comprise an inclination sensor to control the tilting of the tightening device 20.

Figure 5:
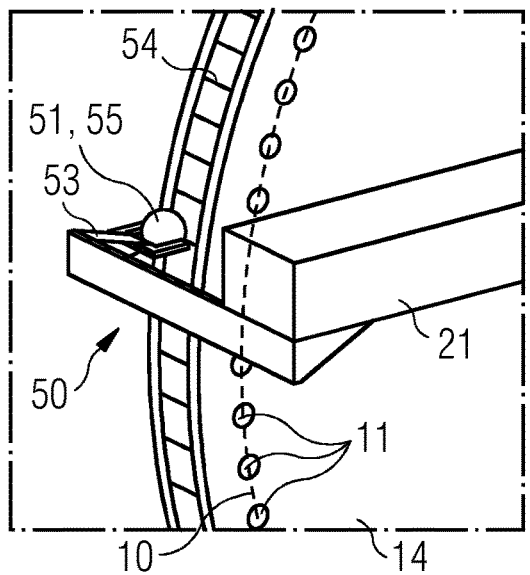
FIG. 5 shows a rotational movement unit according to another embodiment configured to rotate the tightening device, comprising a sphere as the rotating means supported by a support.

FIG. 5 shows a rotational movement unit 50 according to another embodiment configured to rotate the tightening device 20, comprising a sphere 51 as the rotating means 55 supported by a support 53.

The rotational movement unit 50 generates the rotational movement of the tightening device 20 around the center axis 44. This can be achieved with a motor triggering the rotation of the sphere 51. The sphere 51 rotates on a rotational movement unit rail 54 to accurately control the rotation and position of the tightening device 20. Controlling the movement of the sphere 51 results in a more precise control of the angular position of the tightening device 20 in order to engage the torque unit 22 with one specific fastening means 11, lowering the risk of misalignments between the torque unit 22 and the fastening means 11.

Figure 6:
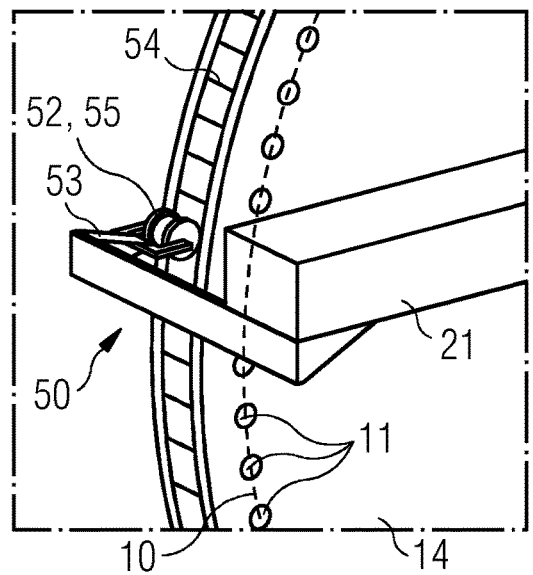
FIG. 6 shows a rotational movement unit according to another embodiment configured to rotate the tightening device, comprising a friction wheel as the rotating means supported by a support.

FIG. 6 shows a rotational movement unit 50 according to another embodiment configured to rotate the tightening device 20, comprising a friction wheel 52 as the rotating means 55 supported by a support 53.

The rotational movement unit 50 generates the rotational movement of the tightening device 20 around the center axis 44. This can be achieved with a motor triggering the rotation of the friction wheel 52. The friction wheel 52 rotates on a rotational movement unit rail 54 to accurately control the rotation and position of the tightening device 20.

In FIGS. 5 and 6, the rotational movement unit 50 rolls on the surface of the bearing flange 15 parallel to the axial direction 46, i.e. at the lateral surface of the bearing flange 15.

Figure 7:
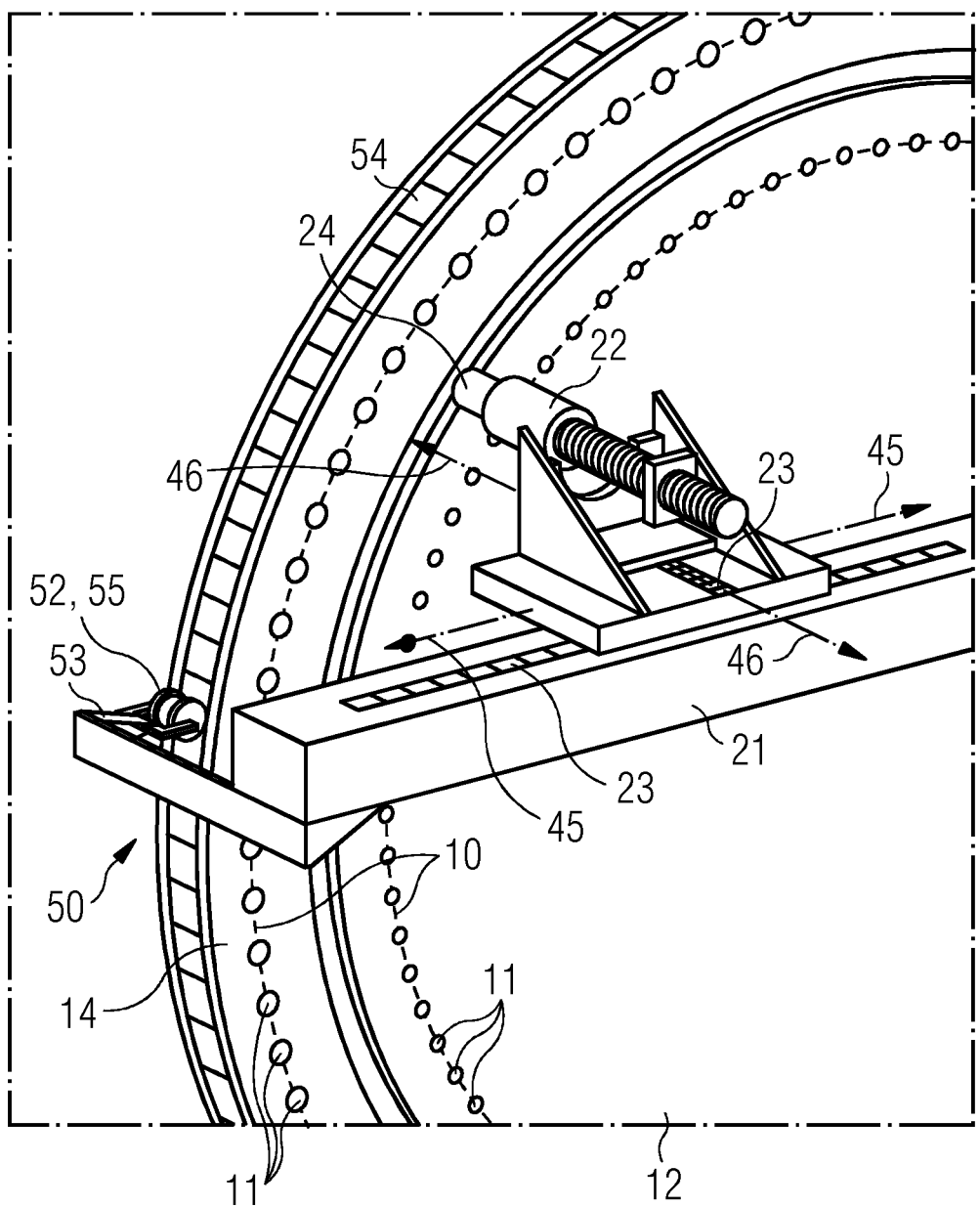
FIG. 7 shows a torque unit mounted on torque unit rails on the first arm to allow a shifting of the torque unit along a radial and an axial direction.

FIG. 7 shows a torque unit 22 mounted on torque unit rails 23 on the first arm 21 to allow a shifting of the torque unit 22 along a radial and an axial direction 45, 46.

The torque unit rail 23 extending along the radial direction 45 allows for the shifting of the torque unit 22 along the radial direction 45. Similarly, the torque unit rail 23 extending along the axial direction 46 allows for the shifting of the torque unit 22 along the axial direction 46.

The rotational movement unit 50 is coupled at the end of the first arm 21. The coupling between these two components can be done on rails similarly to the coupling of the torque unit 22 on the first arm 21 in order to be able to axially and radially shift the rotational movement unit 50, so that the rotational movement unit's 50 position can be adjusted depending on the diameter of the bearing flange 15 or of any other fastening target object 14.

The rotational movement unit 50 rolls on the surface of the bearing flange 15 parallel to the axial direction 46, i.e. at the lateral surface of the bearing flange 15.

In this Figure, the reinforcement plate 12 is attached to the inner ring of the blade bearing and the rotational movement unit 50 rolls on the lateral side of the outer ring of the blade bearing, i.e. on the blade bearing flange 15.

Figure 8:
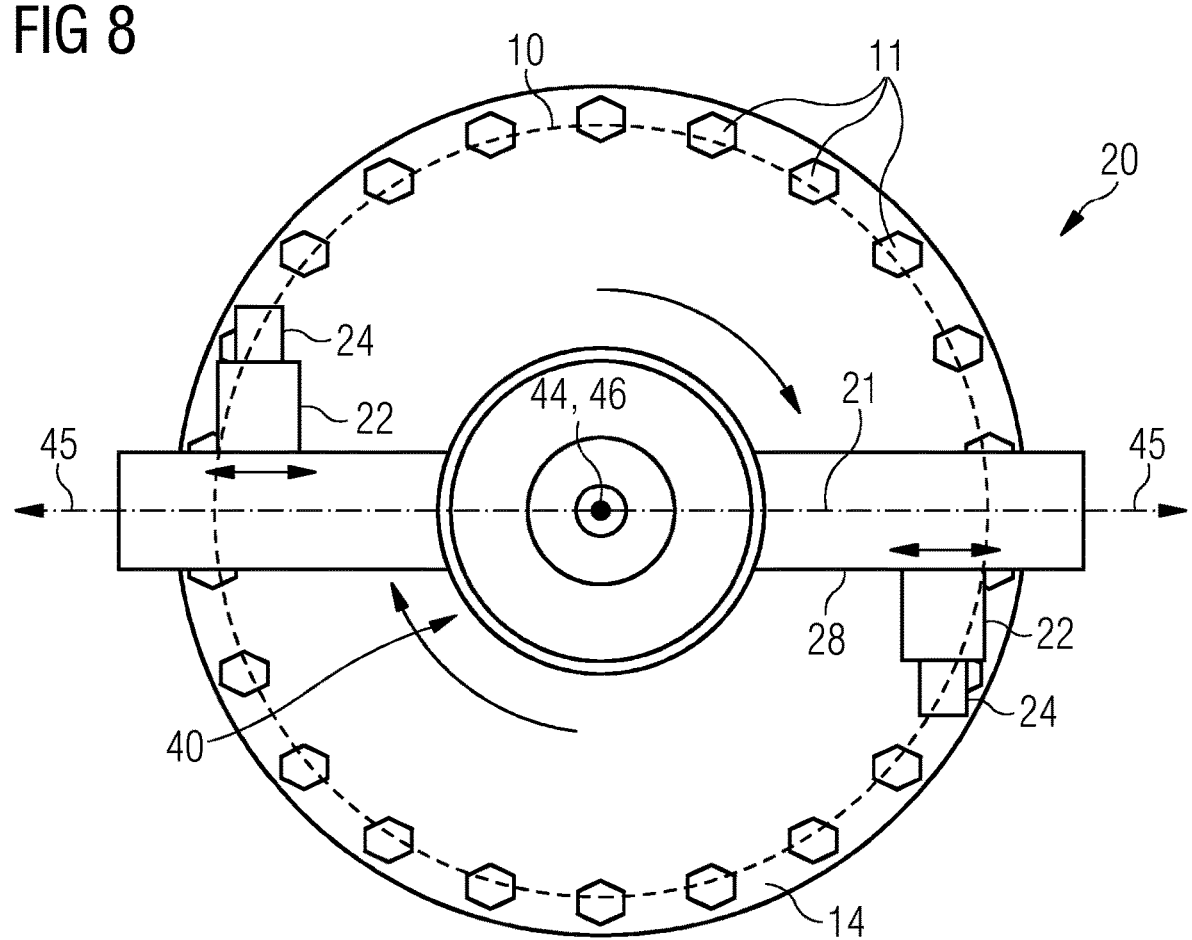
FIG. 8 shows a schematic view of the tightening device mounted on the fastening target object, the tightening device comprising a torque unit attached at a first arm and a further torque unit attached at a second arm.

FIG. 8 shows a schematic view of the tightening device 20 mounted on the reinforcement plate 12, the tightening device 20 comprising a torque unit 22 attached at a first arm 21 and a further torque unit 22 attached at a second arm 28. A plurality of fastening means 11 are arranged on a fastening means circle 10 which can be tightened and/or fastened by the tightening device 20.

To adjust the tightening device 20 to the diameter of the fastening means circle 10, the torque unit 22 can be shifted in radial direction 45. Additionally, to move from one fastening means 11 to the next one to fasten and/or tighten the next fastening means 11, the tightening device 20 can be rotated around the center axis by means of the center bearing unit 40.

The torque unit 22 comprises a tightening socket 24 which engages with one fastening means 11 to fasten and/or tighten the fastening means 11.

As the current embodiment comprises two torque units 22, two fastening means 11 can be simultaneously fastened and/or tightened, thereby reducing the operational time for fastening and/or tightening the fastening means 11.

Figure 9:
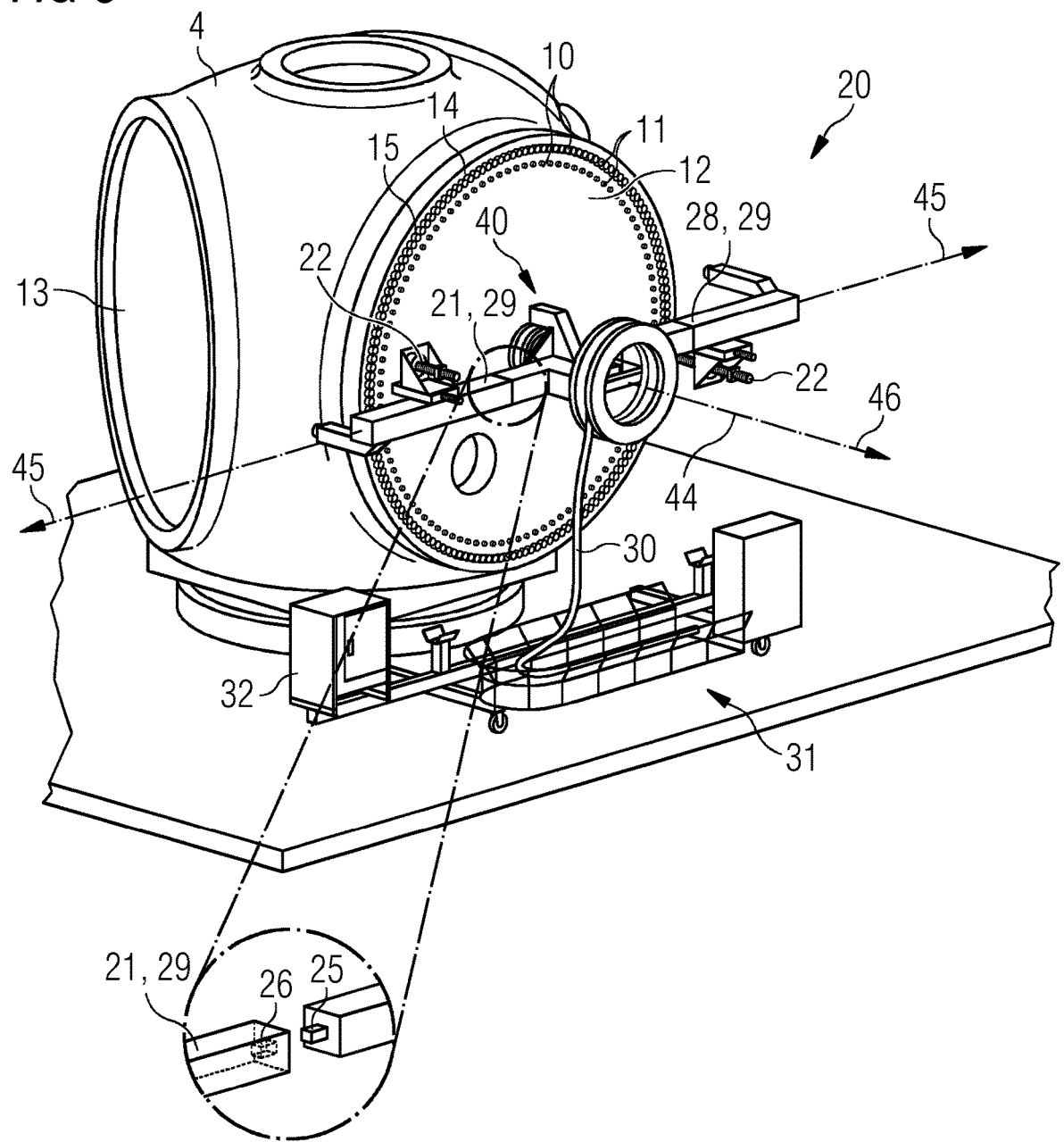
FIG. 9 shows a tightening device according to another embodiment of the invention comprising detachable arms as the first and second arm.

FIG. 9 shows a tightening device 20 according to another embodiment of the invention comprising detachable arms 29 as the first and second arm 21, 28. The detachable arms 29 are coupled to the center bearing unit 40 by means of a pin-socket connection comprising a lock pin 25 at the center bearing unit 40 and a lock socket 26 at the first and second arm 21, 28. However, other types of releasable connections between the detachable arms 29 and the center bearing unit 40 are possible.

The benefit of using detachable arms 29 which can be detached and released from the tightening device 20 is that they can be more easily replaced in case of damage without having to mount a new center bearing unit 50. Additionally, if one torque unit 22 malfunctions and the tightening device 20 comprises a plurality of torque units 22, the detachable arm 29 comprising the malfunctioning torque unit 22 can be detached and the rest of the torque units 22 can proceed with the fastening and/or tightening process.

Figure 10:
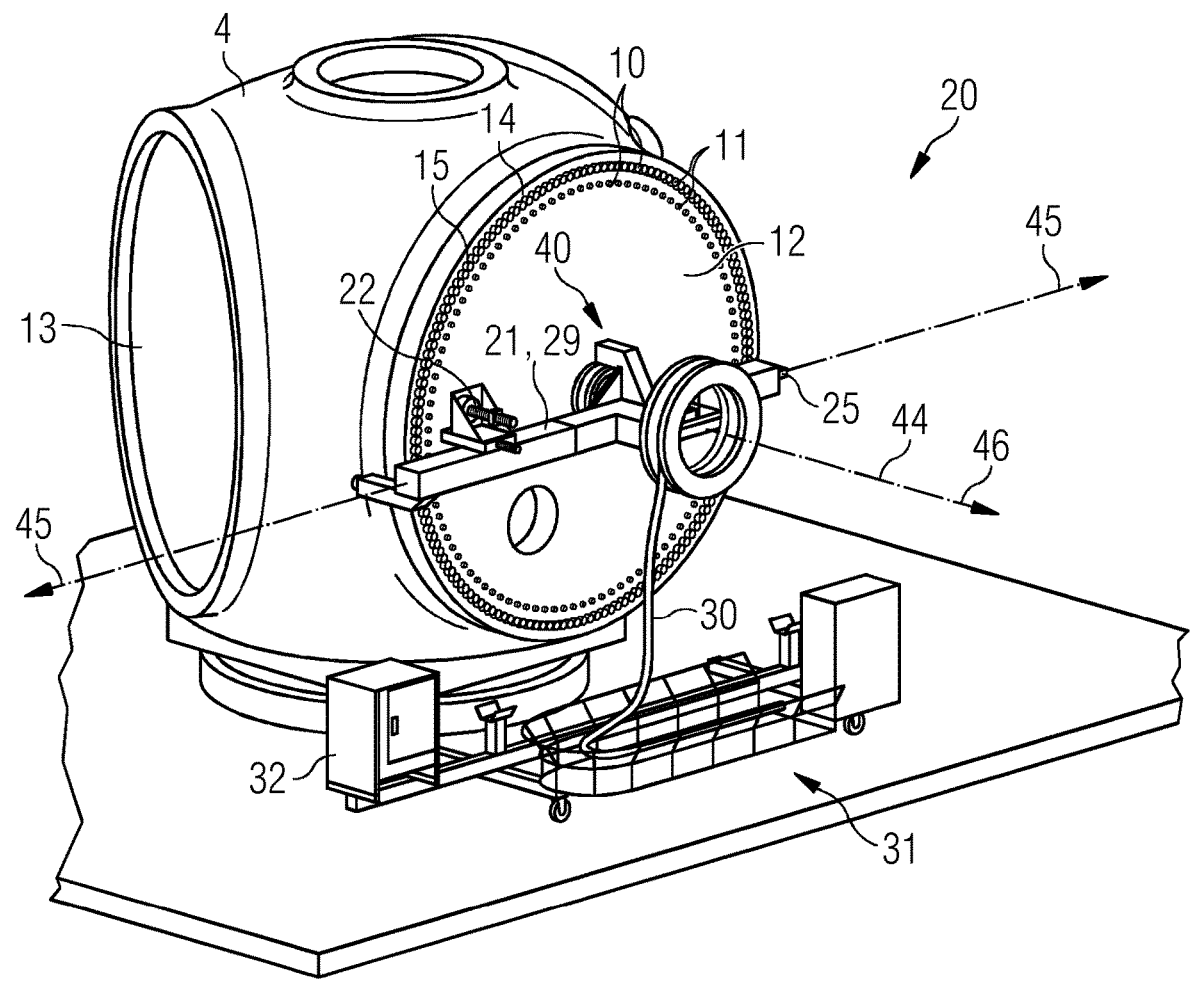
FIG. 10 shows a tightening device according to another embodiment of the invention comprising a first arm as a detachable arm.

FIG. 10 shows a tightening device 20 according to another embodiment of the invention comprising a first arm 21 as a detachable arm 29. In this case, a second arm 28 was detached and the torque unit 22 of the first arm 21 proceeds with the fastening and/or tightening process without the second arm 28.

Figure 11:
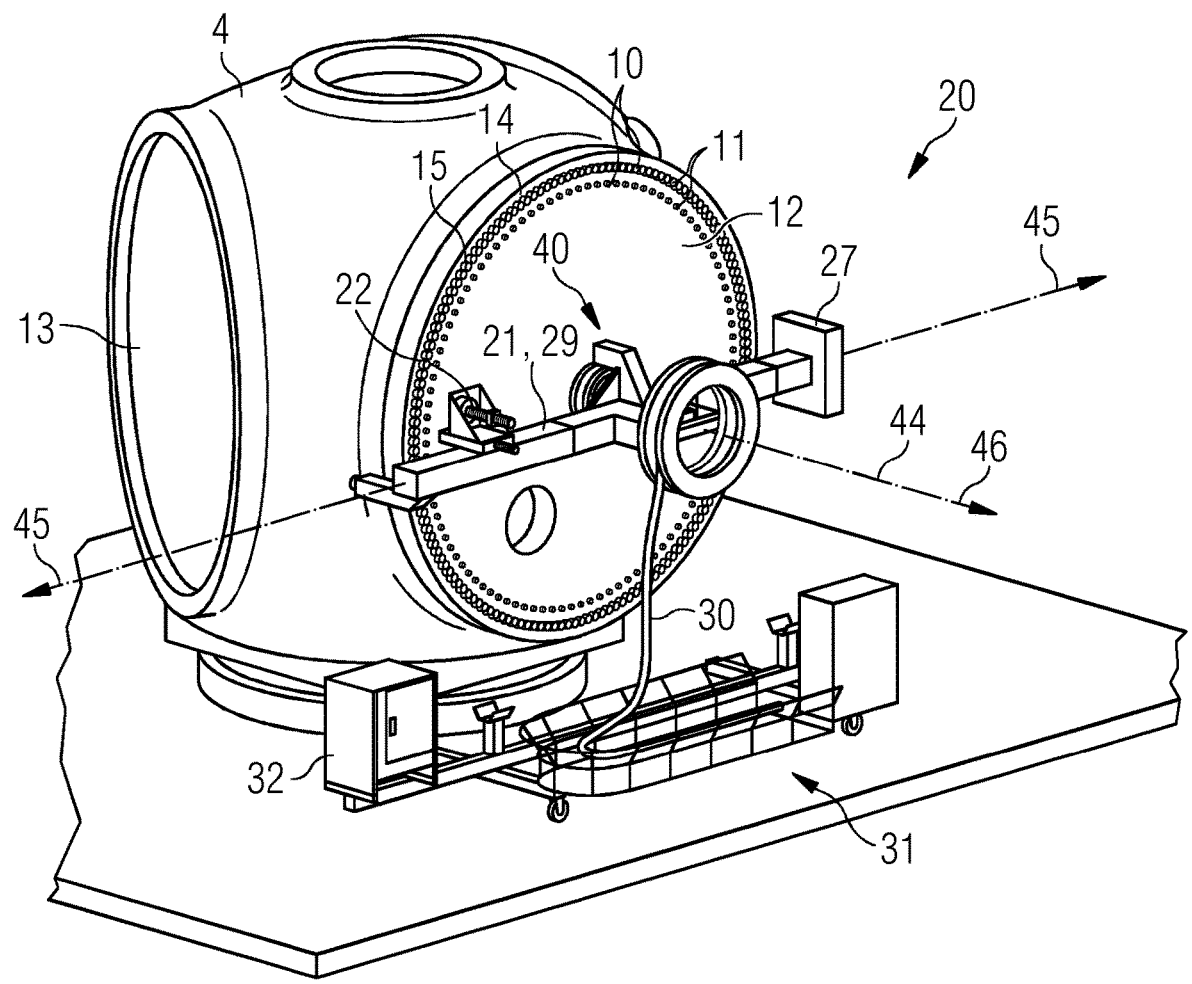
FIG. 11 shows a tightening device according to another embodiment of the invention comprising a first arm as a detachable arm and a counterweight attached to the tightening device at the opposite radial direction than the first arm.

FIG. 11 shows a tightening device 20 according to another embodiment of the invention comprising a first arm 21 as a detachable arm 29 and a counterweight 27 attached to the tightening device 20 at the opposite radial direction 45 than the first arm 21. The counterweight 27 accounts for the weight of a second arm 28 which might have been removed from the tightening device 20 for example due to malfunctioning. The counterweight 27 brings more stability to the tightening device 20 by shifting the center of gravity to the center axis 44 for the case when only one arm is mounted on the tightening device 20.

Figure 12:
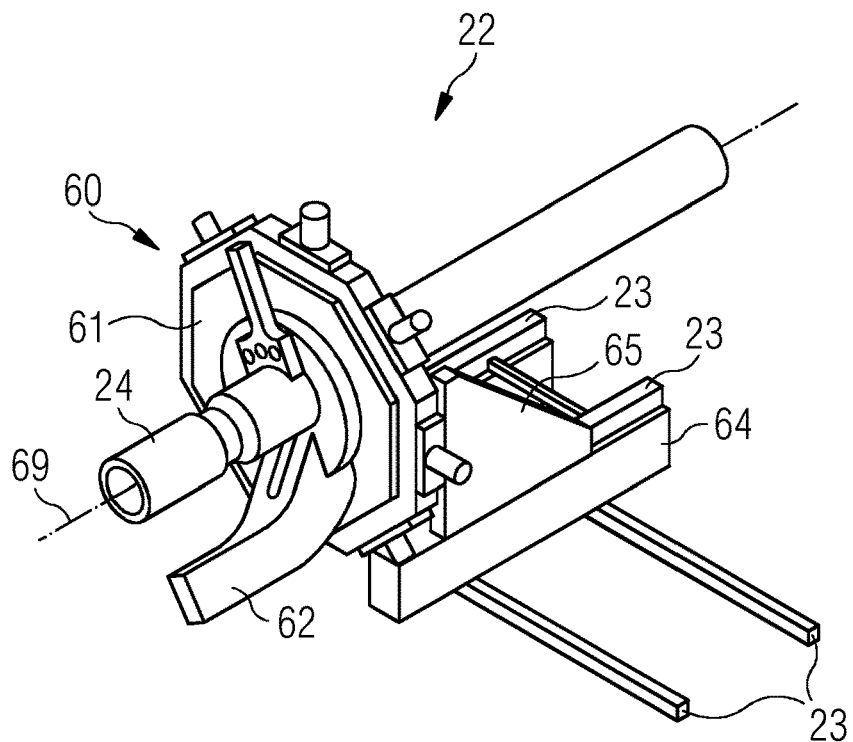
FIG. 12 shows a perspective view of a torque unit having a tolerance compensation unit.
Figure 13:
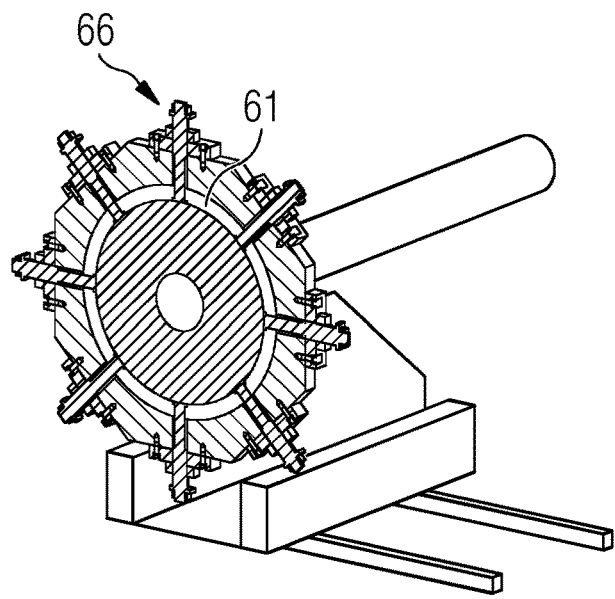
FIG. 13 shows a cross-sectional view of the torque unit having a tolerance compensation unit.
Figure 14:
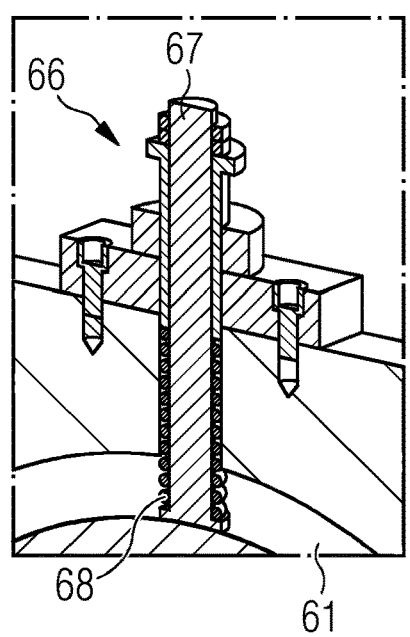
FIG. 14 shows a tolerance compensation unit installed at the torque unit comprising a plurality of plunger spring units.

FIGS. 12 to 14 show the torque unit 22 comprising a tolerance compensation unit 60.

The torque unit 22 shown in FIG. 12 comprises a first baseframe 64 mounted on two torque unit rails 23 extending in the radial direction 45 which allows the torque unit 22 to shift in the radial direction 45.

The torque unit 22 further comprises a second baseframe 65 mounted on two torque unit rails 23, the two torque unit rails 23 being mounted on the first baseframe 64 and extending the axial direction 46 which allows the torque unit 22 to shift in the axial direction 46. The torque unit 22 can comprise a pneumatic cylinder, which is not shown in this Figure, to drive the torque unit 22 on the torque unit rails 23.

The torque unit 22 further comprises a counter holder 62, which in this case is a torque reaction arm which reduces the counterforce at the torque unit 22 during the tightening or fastening operation.

The torque unit 22 further comprises a torque unit bearing 61 for allowing a rotation of the torque unit 22 around the torque unit axis 69 to fasten and/or tighten the fastening means 11. The torque unit axis 69 is parallel to the center axis 44.

The torque unit 22 further comprises a tightening socket 24 configured to be engaged with the fastening means 11 to tighten the fastening means 11 to the fastening target object 14. In this embodiment, the tightening socket 24 has an internal profile matching the external profile of the fastening means 11. The tightening socket 24 can be releasably connected to the torque unit 22 to match the profile of the tightening socket 24 to the profile of the fastening means 11.

The torque unit 22 further comprises a tolerance compensation unit 60 which is shown in more detail in FIGS. 13 and 14. The tolerance compensation unit 60 adjusts misalignments between the torque unit 22 and the fastening means 11. The tolerance compensation unit 60 comprises a plunger spring unit 66, wherein the plunger spring unit 66 comprises a plurality of plungers 67 and springs 68 and exerts a radial force on a shaft of the torque unit 22 to adjust misalignments between the torque unit 22 and the fastening means 11. The plungers 67 are pretensioned with a defined force in order to maintain the torque unit 22 centered at all angular positions of the tightening device 20.

The combination of a torque unit bearing 61 of the type of a plain bearing with the plunger spring unit 66 improves the capability of the a tolerance compensation unit 60 to compensate misalignments, as a misalignment of the shaft results in an overpressure of the fluid of the plain bearing, which together with the pretensioned plungers 67 shift the shaft back to the aligned position.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMBERS

1 Wind turbine
2 Tower
3 Nacelle
4 Hub
5 Blade
10 Fastening means circle
11 Fastening means
12 Reinforcement plate
13 Hub opening
14 Fastening target object
15 Bearing flange
20 Tightening device
21 First arm
22 Torque unit
23 Torque unit rail
24 Tightening socket
25 Lock pin
26 Lock socket
27 Counterweight
28 Second arm
29 Detachable arm
30 Energy chain
31 Energy supply
32 Controller unit
33 Guide
40 Center bearing unit
41 Outer bearing ring
42 Inner bearing ring
43 Roller elements
44 Center axis
45 Radial direction
46 Axial direction
47 Angle sensor
50 Rotational movement unit
51 Sphere
52 Friction wheel
53 Support
54 Rotational movement unit rail
55 Rotating means
60 Tolerance compensation unit
61 Torque unit bearing
62 Counter holder
64 First baseframe
65 Second baseframe
66 Plunger spring unit
67 Plunger
68 Spring
69 Torque unit axis

The invention claimed is:

1. A tightening device for a wind turbine configured to fasten and/or tighten a plurality of fasteners to a target object of the wind turbine, wherein the fasteners are arranged in a circle, the tightening device comprising:
 a center bearing unit arranged to permit rotational movement of the tightening device about a center axis that is concentric with an axis of the target object, wherein the center bearing unit is configured to be attached to a surface of the target object of the wind turbine, wherein the center axis is normal relative to the surface of the target object to which the center bearing unit is configured to be attached to;
 a torque unit to, in operation, apply torque to the fasteners to fasten and/or tighten the fasteners to the target object of the wind turbine; and
 a first arm extending in a radial direction away from the center bearing unit, wherein the torque unit is mounted on the first arm between a first end of the first arm proximate the center bearing unit and a radial outer end of the arm, wherein the first arm is detachably connected to the center bearing unit.

2. The tightening device according to claim 1, wherein the tightening device is configured to remove the fasteners from the target object.

3. The tightening device according to claim 1, wherein the tightening device further comprises a rotational movement unit connected at the radial outer end of the first arm, the rotational movement unit including an electric motor, which, during operation, generates the rotational movement of the tightening device about the center axis.

4. The tightening device according to claim 3, wherein the rotational movement unit further comprises a rotatable element comprising one of a sphere and a friction wheel arranged at a support connected to the tightening device, wherein the rotatable element, in operation, is driven by the electric motor so that the rotational movement unit rotates on a rotational movement unit rail circumferentially arranged along a perimeter of the target object to control the rotation and a position of the tightening device.

5. The tightening device according to claim 1, wherein the torque unit comprises a tightening socket configured to engage the fasteners to tighten and/or fasten the fasteners to the target object.

6. The tightening device according to claim 1, wherein the torque unit comprises a first torque unit rail to translate the torque unit along the radial direction to match a radial position of the torque unit with a radial position of the circle.

7. The tightening device according to claim 6, wherein the torque unit comprises a second torque unit rail to translate the torque unit along an axial direction to engage the torque unit with a respective fastener of the fasteners to tighten the respective fastener to the target object.

8. The tightening device according to claim 1, wherein the torque unit comprises a tolerance compensation unit to adjust misalignments between the torque unit and the fasteners.

9. The tightening device according to claim 8, wherein the tolerance compensation unit comprises a plunger spring unit, wherein the plunger spring unit comprises a plurality of plungers and springs arranged to exert a radial force on a shaft of the torque unit to adjust the misalignments between the torque unit and the fasteners.

10. The tightening device according to claim 1, wherein the torque unit further comprises a torque unit bearing arranged to permit rotational movement of the torque unit about a torque unit axis to fasten and/or tighten the fasteners.

11. The tightening device according to claim 1, wherein the tightening device further comprises an energy chain supported by a guide and connected to an energy supply to provide energy to the tightening device.

12. The tightening device according to claim 1, wherein the tightening device further comprises a controller unit responsive to respective sensors disposed on the rotational movement unit to control the rotation, angular position and/or tightening progress of the tightening device.

13. The tightening device according to claim 1, wherein the first arm is attached to the center bearing unit by way of a removable connection.

14. The tightening device according to claim 1, wherein the tightening device comprises a second arm extending at the opposite radial direction of the first arm.

15. The tightening device according to claim 14, wherein a second torque unit is mounted on the second arm between a first end of the second arm proximate the center bearing unit and a radial outer end of the second arm, wherein the second arm is detachably connected to the center bearing unit.

16. The tightening device according to claim 1, wherein the center bearing unit comprises an outer bearing ring connected to the first arm, and an inner bearing ring configured to be connected to the surface of the target object, and a plurality of roller elements arranged between the outer bearing ring and the inner bearing ring for allowing the rotational movement by way of rotation of the outer bearing ring around the center axis.

17. The tightening device according to claim 1, wherein, when the center bearing unit is attached to the surface of the target object, said surface of the target object is disposed on a vertical plane, and the center axis lies on a horizontal plane.

18. A method for fastening and/or tightening a plurality of fasteners arranged in a circle to a target object by way of a tightening device, the tightening device comprising a center bearing unit configured to allow rotational movement of the tightening device about a center axis that is concentric with an axis of the target object, a torque unit, and a first arm extending radially from the center bearing unit, the method comprising:
    configuring the center bearing unit to be attached to a surface of the target object of the wind turbine, wherein the center axis is normal relative to the surface of the target object to which the center bearing unit is configured to be attached to,
    detachably connecting the first arm to the center bearing unit,
    mounting the torque unit on the first arm between a first end of the first arm proximate the center bearing unit and a radial outer end of the arm,
    adjusting a radial position of the torque unit to match with a radial position of the circle;
    adjusting an angular position of the torque unit to match with an angular position of a first fastener of the plurality of fasteners to be fastened and/or tightened;
    engaging the first fastener with the torque unit; and
    fastening and/or tightening the first fastener by way of torque applied by the torque unit.

* * * * *